Jan. 17, 1928.

E. L. GAINES 1,656,433

ADJUSTABLE VALVE CONTROLLING DEVICE

Filed Oct. 7, 1926

INVENTOR
E. Lamar Gaines
BY
ATTORNEY

Patented Jan. 17, 1928.

1,656,433

UNITED STATES PATENT OFFICE.

ERNEST LAMAR GAINES, OF SEATTLE, WASHINGTON.

ADJUSTABLE VALVE-CONTROLLING DEVICE.

Application filed October 7, 1926. Serial No. 139,997.

This invention relates to valve controlling devices for use, more particularly, in water sprinkling systems. The object of the invention is to provide a valve control which is adjustable to regulate automatically the action of a valve to effect the intermittent delivery of water for desired durations and at predetermined intervals.

The invention consists in the novel construction, adaptation and combination of parts hereinafter described and claimed. The form of the invention now preferred by me is illustrated in the accompanying drawing, in which,—

Figure 3:
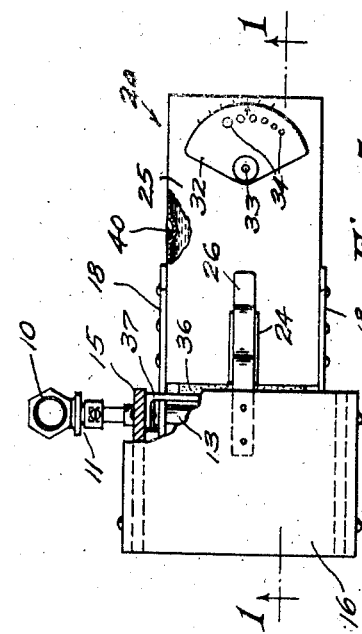
Figure 1:
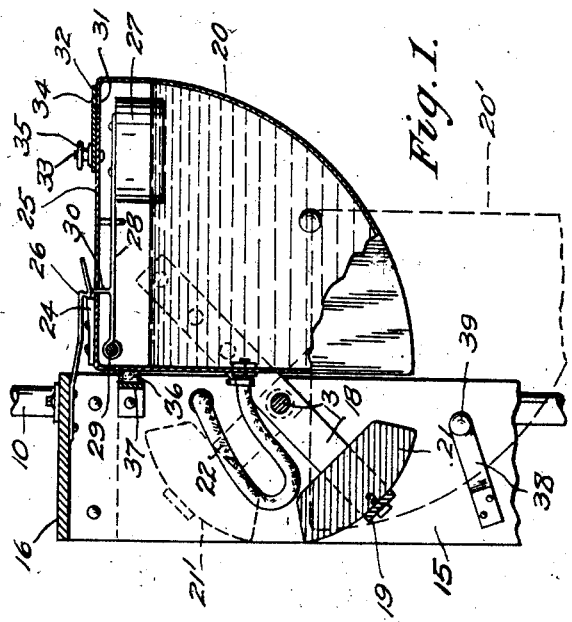
Figure 4:
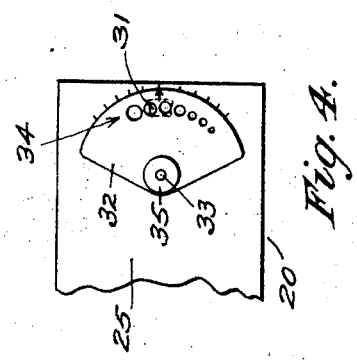
Figure 2:
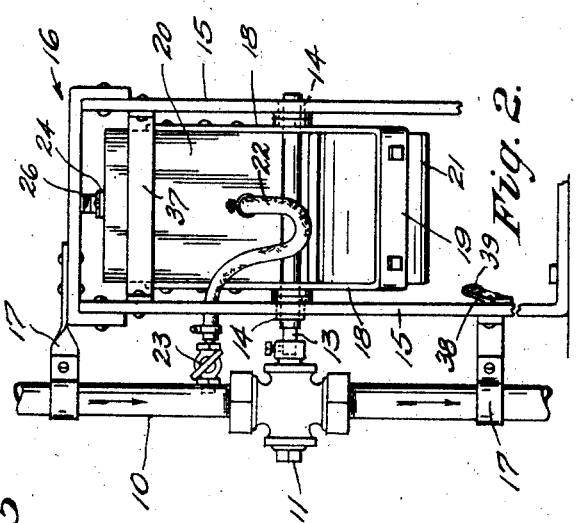
Figure 5:
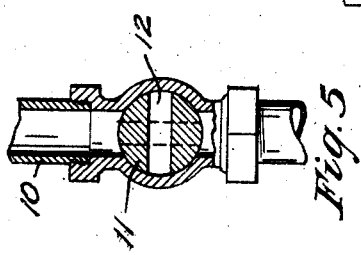

Figure 1 is a vertical sectional view taken substantially on the line 1—1 of Fig. 3; Fig. 2 is a rear elevation; Fig. 3 is a plan view with parts in horizontal section; Fig. 4 is a fragmentary plan view to an enlarged scale; and Fig. 5 is a vertical transverse section of a portion of the service pipe including a regulating valve.

In said drawing, the reference numeral 10 represents a water service pipe which may constitute the supply pipe for a water sprinkling system which is not illustrated.

In said pipe is a valve, hereinafter designated as the service valve, in the nature, preferably, of a rotary cock 11 having a duct 12 extending diametrically therethrough.

The function of the present invention is to regulate the service valve 11 so as to automatically produce an intermittent delivery of water through the service pipe. In carrying out my invention I provide rigid with the rotary cock or service valve a rod extension 13 which is journaled in bearings 14 provided in the side walls 15 of a frame 16. This frame is secured, as by means of brackets 17, to the pipe 10 or other suitable supporting device.

Interiorly of said frame the rod 13 extends through and is rigidly secured to the said elements 18 of a bifurcated beam 19 of a substantially U-shape. Said rod constitutes the fulcrum of said beam and is connected thereto at or about its midlength.

Positioned at one side of the rod 13 between the beam elements 18 and rigidly secured thereto is a receptacle or tank 20 of a substantially triangular shape in longitudinal vertical section as shown in Fig. 1. At the opposite side of the rod 13 from said tank the beam 19 has secured thereto a body 21 of sufficient weight to overbalance the weight of the tank when empty, or nearly so, and tends to yieldingly retain the tank in its elevated position as represented in Figs. 2 and 3 and by full lines in Fig. 1. Said tank is connected to an end of a flexible tube or hose 22 whose other end is communicatively connected through the medium of a charging valve 23 with the pipe 10 at the receiving side of the service valve 11. By such arrangement, water is supplied into the tank continuously during the operation of the device subject, however, to the adjustment of the charging valve 23.

As shown, a catch 24 provided upon the top wall 25 of the tank is engageable by a resilient detent 26 provided upon the frame 16 when the tank is brought by the power of the weight 21 into the upright position in which it is represented by full lines in Fig. 1. To release the tank when the same receives a predetermined charge of water, I provide a float 27 attached to the free end of an arm 28 which is pivotally connected at its other end to a pin 29, said arm having a stud element 30 which by the elevating of the float, is eventually protruded through an aperture of the tank wall 25 to effect the disengagement of the detent with respect to the catch 24.

In the outer portion of the tank wall 25 the same is provided with a water discharge orifice 31. The effective size of this orifice is controllable by means of a cover plate 32 which is pivotally connected to a pin 33 provided on the tank, said plate having a series of holes 34 of progressively increasing diameters which are disposed so that one or more of the holes may be brought, selectively, into register with said orifice, see Fig. 4, by turning the plate 32 into a desired position. The plate is secured in its adjusted position as by means of a clamping nut 35 engaging screw threads provided upon the pin 33.

36 represents a bumper of rubber or other suitable elastic or yieldable material provided upon a bar member 37 of the frame 16 for overcoming the momentum of the tank in stopping when it is swung upwardly by the action of the weight 21.

38 represents a resilient latch secured at one of its ends to the frame 16 and provided at its outer end with a protuberance 39 adapted to engage within a recess such as 40 provided in the side wall of the tank 20 when the latter is in the position in which it is indicated by dotted lines 20¹ in Fig. 1.

Assuming the movable parts of the apparatus occupy the relative positions in which they are represented by full lines in Fig. 1—that is to say, with the tank upright and held in its elevated position by means of the detent 26—the continued supply of water into the tank through the hose 22 further elevates the float 27 to cause the associated stud 30 to dislodge the detent 26 from the catch 24 to release the tank. When this occurs the weight of the water within the tank is more than sufficient to overbalance the counterweight 21 whereupon gravitation acts to swing the tank downwardly into its dotted line 20¹ position and elevate the counterweight into its dotted line 21¹ position.

The tank in being thus swung down about the axis of the rod 13 causes the orifice 31 to be brought close to the then bottom of the tank permitting the water to escape therethrough until the amount of water within the tank is depleted sufficiently to enable the counterweight to effect the disengagement of the latch 38 from tank and the return of the latter to the elevated position in which it is shown by full lines in Fig. 1.

As the tank approaches such elevated position the momentum of the tank counterweight, etc., is overcome by the bumper cushion 36, and the catch 24 is engaged by the detent 26 thereby completing a cycle of operation.

In practice, the reciprocatory vertical travel of the tank acts through the medium of the rod 13 to close and open the service valve, thereby delivering water through the pipe 10 for sprinkling or other purposes while the tank is being charged and preventing the delivery of service water through the pipe while the water is being discharged from the tank.

Water is desirably supplied uninterruptedly into the tank for charging and recharging the same during the operation of the apparatus but at a slower rate than that afforded by the discharge orifice as regulated by the selected hole or holes of the plate 32; hence the time required in emptying the tank is determined by the differential between the water inlet and outlet.

As shown in Fig. 1, the arrangement of the beam 19 is such that it occupies an angle of approximately forty-five degrees from the horizontal at the termination of both its upward and downward tank-carrying movements through an arc of a circle whose center is the axis of the rod 13. By such an arrangement of the tank and the counterweight their moments of force will gradually increase until their centers of gravity have passed through the horizontal plane in which the axis of the rod 13 is located.

Furthermore, the uplifting of the tank and also of the counterweight is effected by gravity subsequent to the critical periods, when the combined weight of the tank and its water contents is respectively less and greater than the effective weight of the counterweight.

These conditions are fulfilled by the latch 38 releasably engaging the tank in its lower position and by the float-controlled detent 26 releasably engaging the tank in its upper position.

By such devices the tank is releasably held beyond both of its critical periods until the difference between the weights at opposite ends of the beam will produce energy sufficient to impart rotary movement to the service valve and also carry the tank into engageable relation with the detent and latch respectively.

The above features of the invention are contributory with the arcuate travel of both the counterweight and the tank to provide a valve control which will impart quick and reliable opening and closing movements to the valve.

Among important uses of the invention may be mentioned intermittently operated sprinkling systems for wetting roofs of buildings as a fire protection; for lawn and garden irrigation; and in the wetting of newly laid cement work in the curing and setting of the same.

While I have illustrated and described the preferred form of the invention, I do not wish to be understood as confining myself to the illustrated embodiment as changes may be made thereto as, for example, by employing a spring of known form in lieu of the counterweight, as shown, for elevating the tank. It is to be understood, moreover, that I do not confine myself specifically to the embodiment of the invention except as limited by the scope of the following claims.

What I claim is,—

1. Gravity controlled apparatus for effecting the opening and closing movement of a service valve of a water delivery pipe, comprising an overturnable water receptacle having an orifice in its upper portion, operative connections between the receptacle and said valve to cause the latter to be moved into one position when the tank is being upset and into another position when the receptacle is being returned to its upright position, devices tending to retain the receptacle in its upright position, and means to supply water progressively into said receptacle to produce therein an unbalanced weight to overcome the power of said devices and effect the overturning of the receptacle into a position for the escape of water through said orifice, said devices serving to open said valve while the devices are returning the receptacle into its upright water receiving position.

2. In a gravity actuated valve regulating device, in combination, a water receptacle arranged for upward and downward reciprocatory movment, said receptacle being provided with a controllable discharge orifice, operative connection between the receptacle and the valve to effect the opening and closing of the same in each reciprocatory movement of the receptacle, a counterweight for elevating the receptacle, and means for supplying water into the receptacle to obtain a suitable weight of water therein for overcoming the power of the counterweight and effect a downward movement of the receptacle permitting the escape of water from the orifice thereof to render the counterweight operable to elevate the receptacle.

3. In a gravity actuated valve-regulating device, a water receptacle arranged for reciprocatory movements, said receptacle being provided with a controllable water discharge orifice, means operatively connecting said receptacle to the valve for moving the latter into and from its closing positions successively in each reciprocatory travel of the receptacle, means acting to elevate the receptacle, means to supply water into the receptacle to be acted upon by gravity to overcome the power of the receptacle elevating means for effecting downward movements of the receptacle into its water discharging position, and means for yieldably retaining the receptacle in its upper and lower positions respectively during the critical periods of the receptacle's movements.

4. In a gravity actuated valve-controlling device, the combination of a beam adapted to be operatively connected to the valve, a water receptacle carried by one end of the beam and provided with an orifice for discharging water from the receptacle as the latter approaches the end of its downward travel, means for supplying water into the receptacle, a counterweight carried by the other end of the beam and adapted to effect upward movement of said receptacle when the water is discharged therefrom, and means for releasably retaining the receptacle in its upper and lower positions respectively until after the critical water supplying and discharging periods of the receptacle.

Signed at Seattle, Washington, this 23rd day of September, 1926.

ERNEST LAMAR GAINES.